United States Patent
Li et al.

(10) Patent No.: US 11,005,615 B2
(45) Date of Patent: May 11, 2021

(54) INTER-CELL INTERFERENCE MITIGATION FOR UPLINK ULTRA-RELIABLE LOW LATENCY COMMUNICATIONS

(71) Applicant: QUALCOMM Incorporated, San Diego, CA (US)

(72) Inventors: Chong Li, Weehawken, NJ (US); Junyi Li, Chester, NJ (US); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/138,531

(22) Filed: Sep. 21, 2018

(65) Prior Publication Data

US 2019/0158240 A1 May 23, 2019

Related U.S. Application Data

(60) Provisional application No. 62/590,253, filed on Nov. 22, 2017.

(51) Int. Cl.
*H04L 5/00* (2006.01)
*H04W 4/02* (2018.01)
*H04L 1/18* (2006.01)
*H04W 52/02* (2009.01)

(52) U.S. Cl.
CPC .......... *H04L 5/0032* (2013.01); *H04L 1/1861* (2013.01); *H04L 5/0053* (2013.01); *H04L 5/0094* (2013.01); *H04W 4/023* (2013.01); *H04W 52/0216* (2013.01)

(58) Field of Classification Search
CPC .................................................... H04L 5/0032
See application file for complete search history.

(56) References Cited

U.S. PATENT DOCUMENTS

| 8,982,750 | B2 | 3/2015 | Palanki et al. |
| 2009/0225876 | A1* | 9/2009 | Sung ............... H04L 1/0045 375/260 |
| 2010/0182903 | A1* | 7/2010 | Palanki ............ H04L 1/0041 370/225 |

(Continued)

FOREIGN PATENT DOCUMENTS

WO 2010083451 A2 7/2010

OTHER PUBLICATIONS

Huawei et al., "UL Multiplexing Between URLLC and eMBB", 3GPP Draft, R1-1803659, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051425956, 8 Pages, Retrieved from the Internet:URL:http://www.3gpp.org/ftp/Meetings%5F3GPP%5FSYNC/RAN1/Docs/ [retrieved on Apr. 15, 2018].

(Continued)

*Primary Examiner* — Kevin M Cunningham
(74) *Attorney, Agent, or Firm* — Patterson & Sheridan, L.L.P.

(57) ABSTRACT

Certain aspects of the present disclosure relate to communication systems, and more particularly, to techniques for mitigating inter-cell interference for uplink ultra-reliable low latency communications (URLLC).

30 Claims, 12 Drawing Sheets

(56) References Cited

U.S. PATENT DOCUMENTS

| | | | | |
|---|---|---|---|---|
| 2013/0102320 A1* | 4/2013 | Suzuki | ............... | H04W 72/042 |
| | | | | 455/452.1 |
| 2014/0307713 A1* | 10/2014 | Lindoff | ............... | H04J 11/0026 |
| | | | | 370/332 |
| 2014/0376461 A1* | 12/2014 | Park | ..................... | H04L 1/0061 |
| | | | | 370/329 |
| 2018/0035459 A1* | 2/2018 | Islam | ................... | H04L 5/0096 |

OTHER PUBLICATIONS

International Search Report and Written Opinion—PCT/US2018/057516—ISA/EPO—dated Feb. 5, 2019.

Qualcomm Incorporated: "DL Indication Channel Design Principle for URLLC/eMBB Dynamic Multiplexing", 3GPP Draft, R1-1708637, DL Indication Channel Design Principle for URLLC/eMBB Dynamic Multiplexing, 3rd Generation Partnership Project (3GPP), Mobile Competence Centre, 650, Route Des Lucioles, F-0692, vol. RAN WG1, No. Hangzhou, May 15, 2017-May 19, 2017, May 7, 2017 (May 7, 2017), XP051263266, 10 Pages, Retrieved from the Internet: URL:http://www.3gpp.org/ftp/tsg_ran/WG1_RL1/TSGR1_89/Docs/ [retrieved on May 7, 2017].

* cited by examiner

INTER-CELL INTERFERENCE MITIGATION FOR UPLINK ULTRA-RELIABLE LOW LATENCY COMMUNICATIONS

CROSS-REFERENCE TO RELATED APPLICATION & PRIORITY CLAIM

This application claims benefit of and priority to U.S. Provisional Application No. 62/590,253, filed Nov. 22, 2017, which is herein incorporated by reference in its entirety for all applicable purposes.

Field

The present disclosure relates generally to wireless communication systems, and more particularly, to techniques for mitigating inter-cell interference for uplink ultra-reliable low latency communications (URLLC).

Background

Wireless communication systems are widely deployed to provide various telecommunication services such as telephony, video, data, messaging, and broadcasts. Typical wireless communication systems may employ multiple-access capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes detecting a decoding failure of at least one grant free transmission received from a first user equipment (UE). The method also includes, in response to the detection, triggering at least a second UE to reduce interference between one or more uplink transmissions from the second UE and one or more uplink transmissions subsequent to the at least one grant free transmission from the first UE.

Certain aspects provide a method for wireless communication by a user equipment (UE). The method generally includes sending at least a first transmission of one or more transmissions to a base station (BS) serving the UE. The method also includes receiving an indication triggering the UE to reduce interference between at least a second transmission of the one or more transmissions and one or more uplink transmissions from another UE. The method further includes, in response to the indication, reducing transmission power of the at least second transmission to reduce the interference.

Certain aspects provide an apparatus for wireless communication. The apparatus includes means for detecting a decoding failure of at least one grant free transmission received from a first UE. The apparatus also includes means for triggering, in response to the detection, at least a second UE to reduce interference between one or more uplink transmissions from the second UE and one or more uplink transmissions subsequent to the at least one grant free transmission from the first UE.

Certain aspects provide an apparatus for wireless communication. The apparatus includes means for sending at least a first transmission of one or more transmissions to a BS serving the apparatus. The apparatus also includes means for receiving an indication triggering the apparatus to reduce interference between at least a second transmission of the one or more transmissions and one or more uplink transmissions from another apparatus. The apparatus further includes means for reducing, in response to the indication, transmission power of the at least second transmission to reduce the interference.

Certain aspects provide an apparatus for wireless communication. The apparatus generally includes at least one processor and a memory coupled to the at least one processor. The at least one processor is configured to detect a decoding failure of at least one grant free transmission received from a first UE. The at least one processor is also configured to trigger, in response to the detection, at least a second UE to reduce interference between one or more uplink transmissions from the second UE and one or more uplink transmissions subsequent to the at least one grant free transmission from the first UE.

Certain aspects provide an apparatus for wireless communication. The apparatus generally includes at least one processor and a memory coupled to the at least one processor. The at least one processor is configured to send at least a first transmission of one or more transmissions to a BS serving the apparatus. The at least one processor is also configured to receive an indication triggering the apparatus to reduce interference between at least a second transmission of the one or more transmissions and one or more uplink transmissions from another apparatus. The at least one processor is further configured to reduce, in response to the indication, transmission power of the at least second transmission to reduce the interference.

Certain aspects provide a computer-readable medium having computer-executable code stored thereon for wireless communications by an apparatus. The computer executable code includes code for detecting a decoding failure of at least one grant free transmission received from a first UE. The computer executable code also includes code for triggering, in response to the detection, at least a second UE to reduce interference between one or more uplink transmissions from the second UE and one or more uplink transmissions subsequent to the at least one grant free transmission from the first UE.

Certain aspects provide a computer-readable medium having computer-executable code stored thereon for wireless communications by an apparatus. The computer executable code includes code for sending at least a first transmission of one or more transmissions to a BS serving the apparatus. The computer executable code also includes code for receiving an indication triggering the apparatus to reduce interference between at least a second transmission of the one or more transmissions and one or more uplink transmissions from another apparatus. The computer executable code further includes code for reducing, in response to the indication, transmission power of the at least second transmission to reduce the interference.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
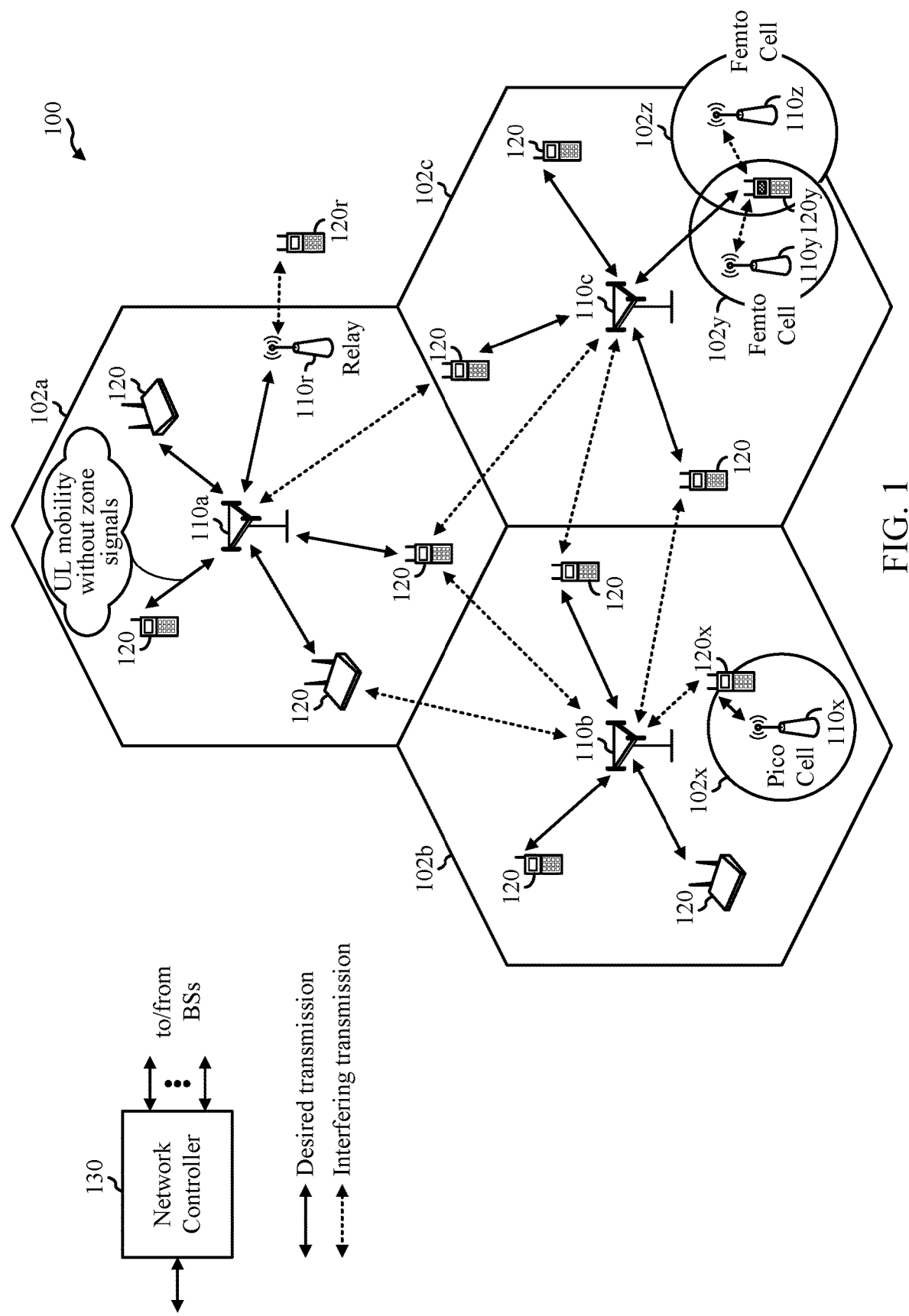
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In some systems, such as NR, a first cell supporting a first type of traffic/service (e.g., uplink URLLC traffic) may be neighboring a second cell supporting a second type of traffic/service (e.g., uplink eMBB traffic). In one reference example, a URLLC UE may be transmitting uplink URLLC traffic to a gNB in the first cell, and an eMBB UE may be transmitting uplink eMBB traffic to a gNB in the second cell. In such situations, there may be cases where the uplink eMBB traffic in the neighboring second cell interferes with the uplink URLLC traffic in the first cell. eMBB traffic, for example, generally has a longer transmit duration compared to URLLC traffic, which is generally sporadic and bursty, and thus, the sporadic uplink traffic for a cell-edge URLLC UE may be vulnerable due to the inter-cell interference from the eMBB uplink traffic. If an uplink URLLC transmission fails in the first transmission, for example, the re-transmission(s) may have a high likelihood of failing again due to the consistent inter-cell interference from the neighboring eMBB UEs.

Accordingly, aspects provide techniques and apparatus for mitigating inter-cell interference for uplink (UL) URLLC. For example, using aspects presented herein, a gNB may receive a grant-free transmission (e.g., associated with uplink URLLC traffic) from a first UE (e.g., URLLC UE) served by the gNB, and detect a decoding failure of the grant-free transmission received from the first UE. The gNB, in response to the detection, may trigger a second UE (e.g., an eMBB UE in a neighboring cell) to reduce interference between uplink transmission(s) from the second UE and uplink transmission(s) subsequent to the grant-free transmission from the first UE. Once the second UE receives the indication, the second UE may reduce transmission power of its uplink transmission(s) to reduce the interference. Doing so provides an inter-cell interference mitigation scheme that can be used to protect the (re)-transmission(s) of the cell edge URLLC uplink traffic.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
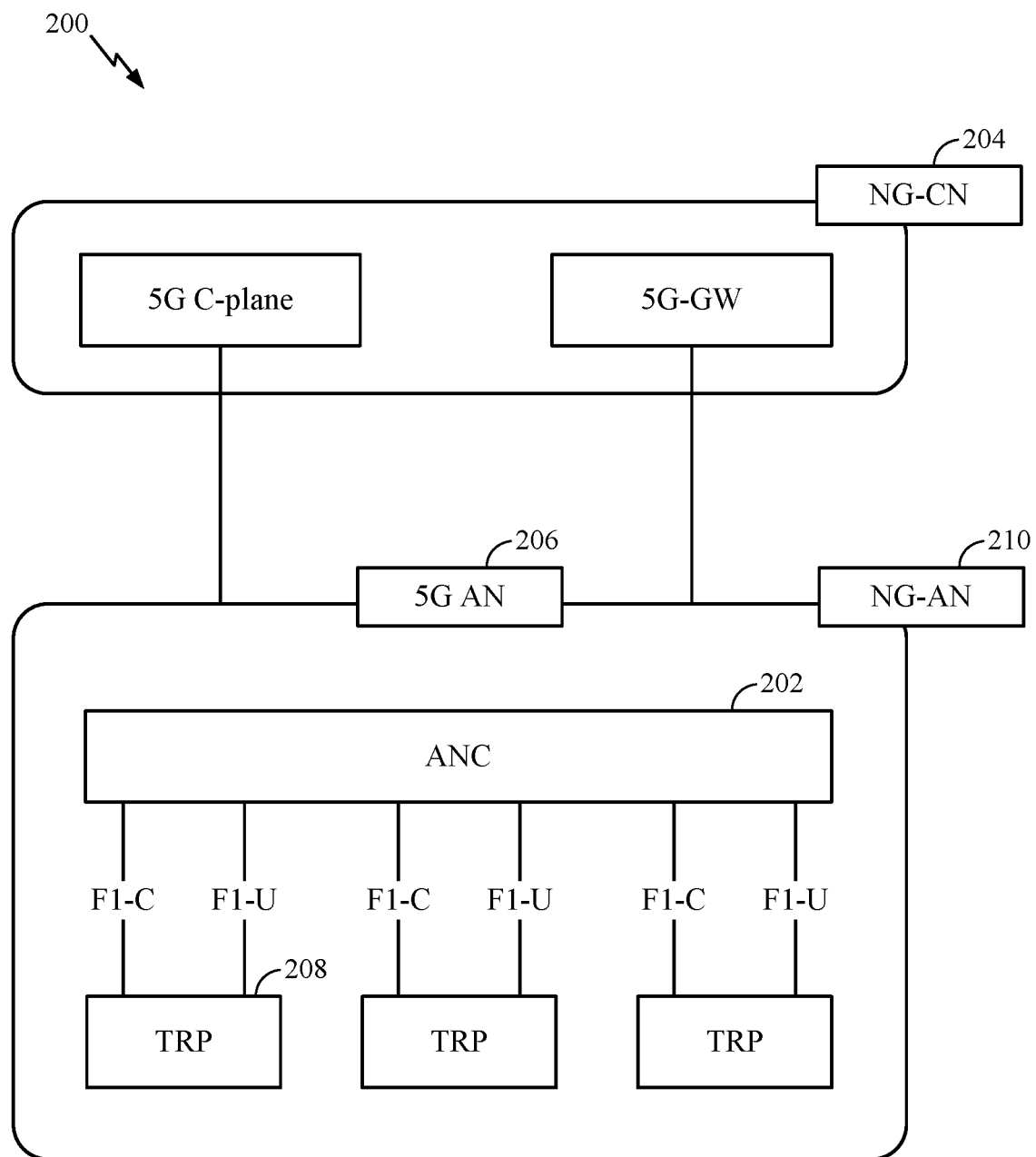
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
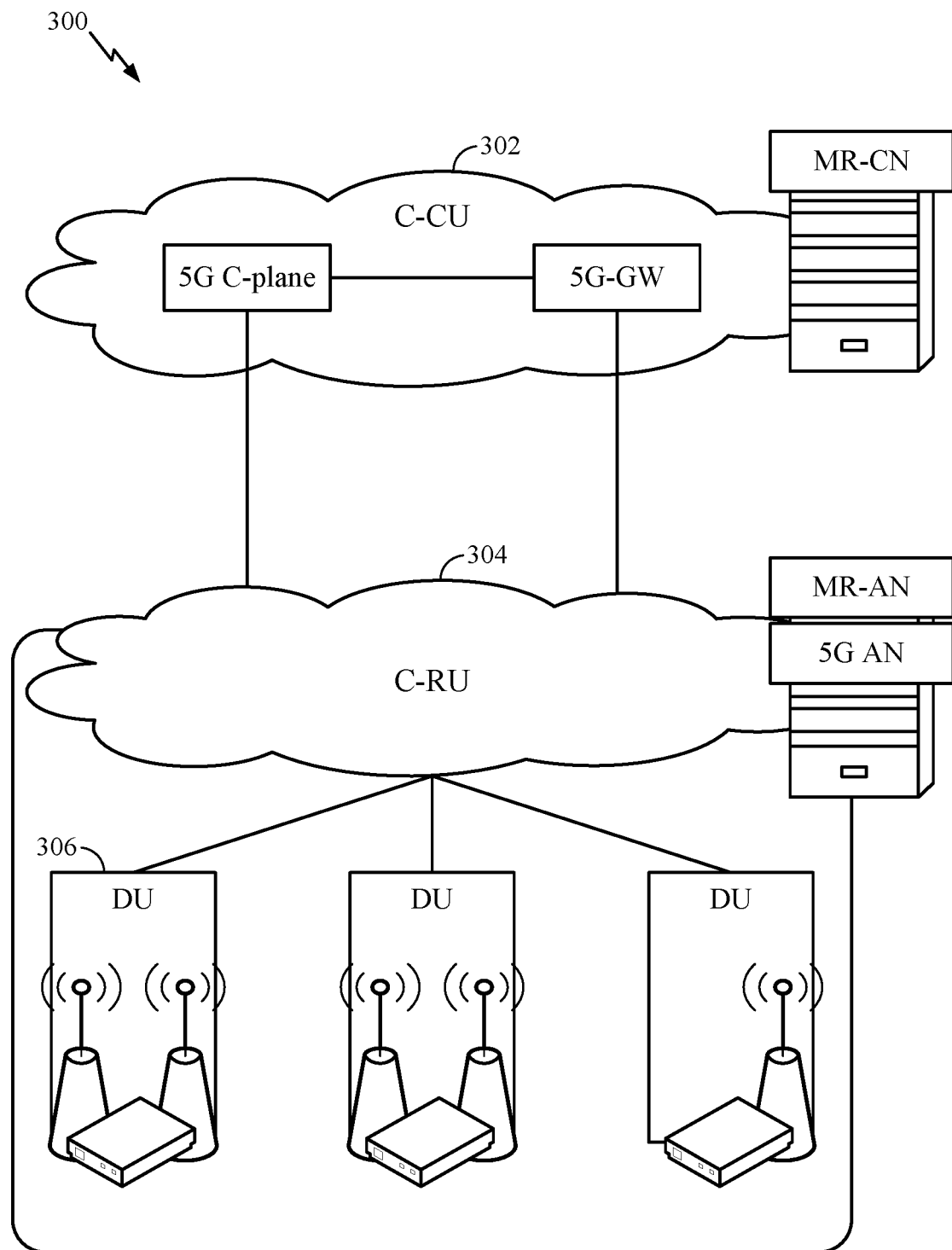
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
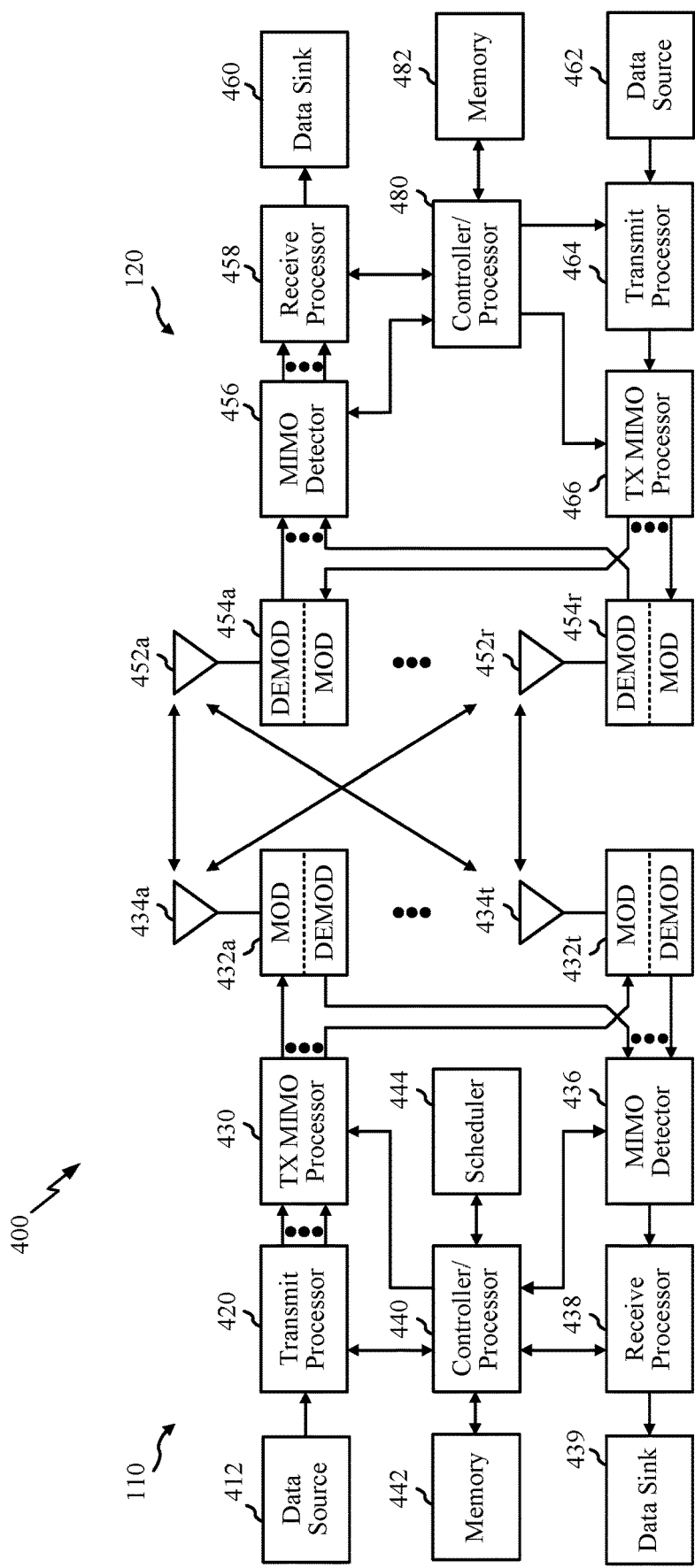
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-11.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10 and/or other processes for the techniques described herein. The processor 480 and/or other processors and modules at the UE 120 may also perform or direct, e.g., the execution of the functional blocks illustrated in FIG. 11 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
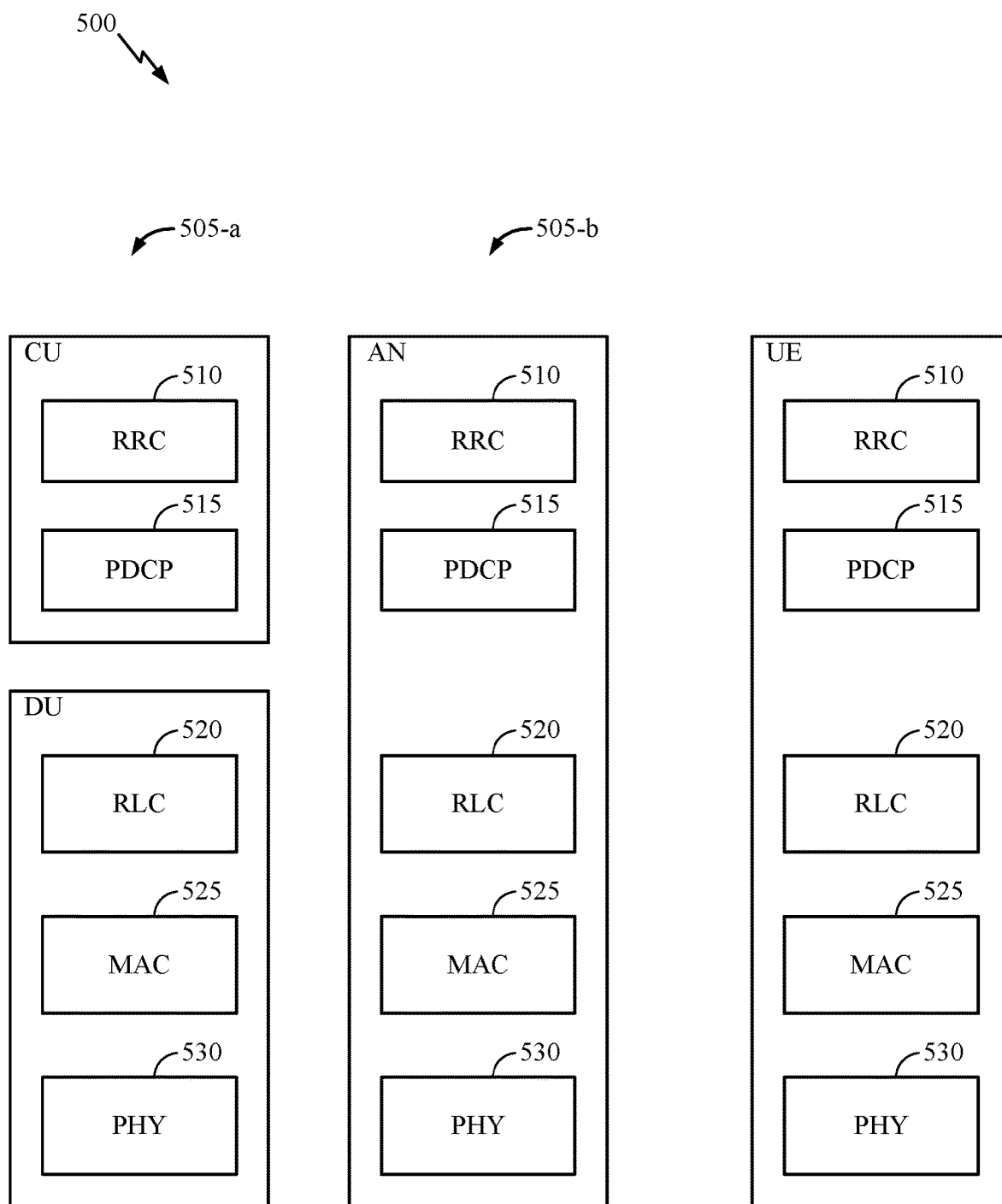
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
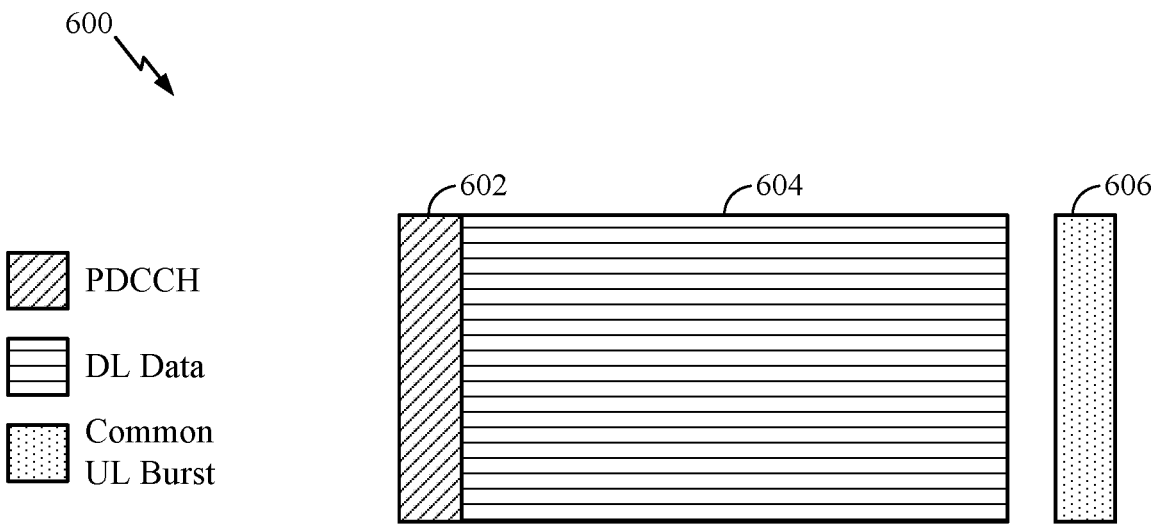
FIG. 6 illustrates an example of a downlink-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
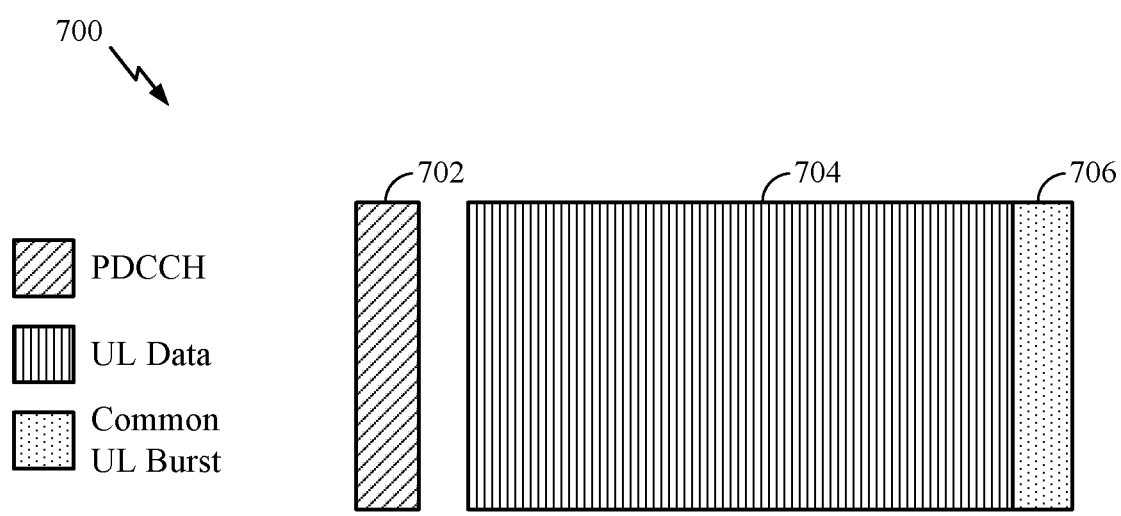
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Grant-Free Transmission

Certain wireless communication systems, e.g., NR, may support grant-free (GF) transmission. URLLC UL in NR, for example, generally supports grant-free transmission. As used herein, grant-free transmission generally refers to data transmission with grant-free resource(s) (e.g., no resources dedicated/allocated in an uplink grant). For UL transmission without an UL grant, open-loop power control for the transmission may be based on a pathloss estimate. In some cases, closed-loop power control based on network signaling may be supported.

There may be two types of UL data transmission without a grant: Type 1 and Type 2. For Type 1, the UL data transmission without grant may be only based on RRC (re)configuration without any L1 signaling. For Type 2, the UL data transmission without grant may be based on both RRC configuration and L1 signaling for activation/deactivation for UL data transmission without grant.

Figure 8:
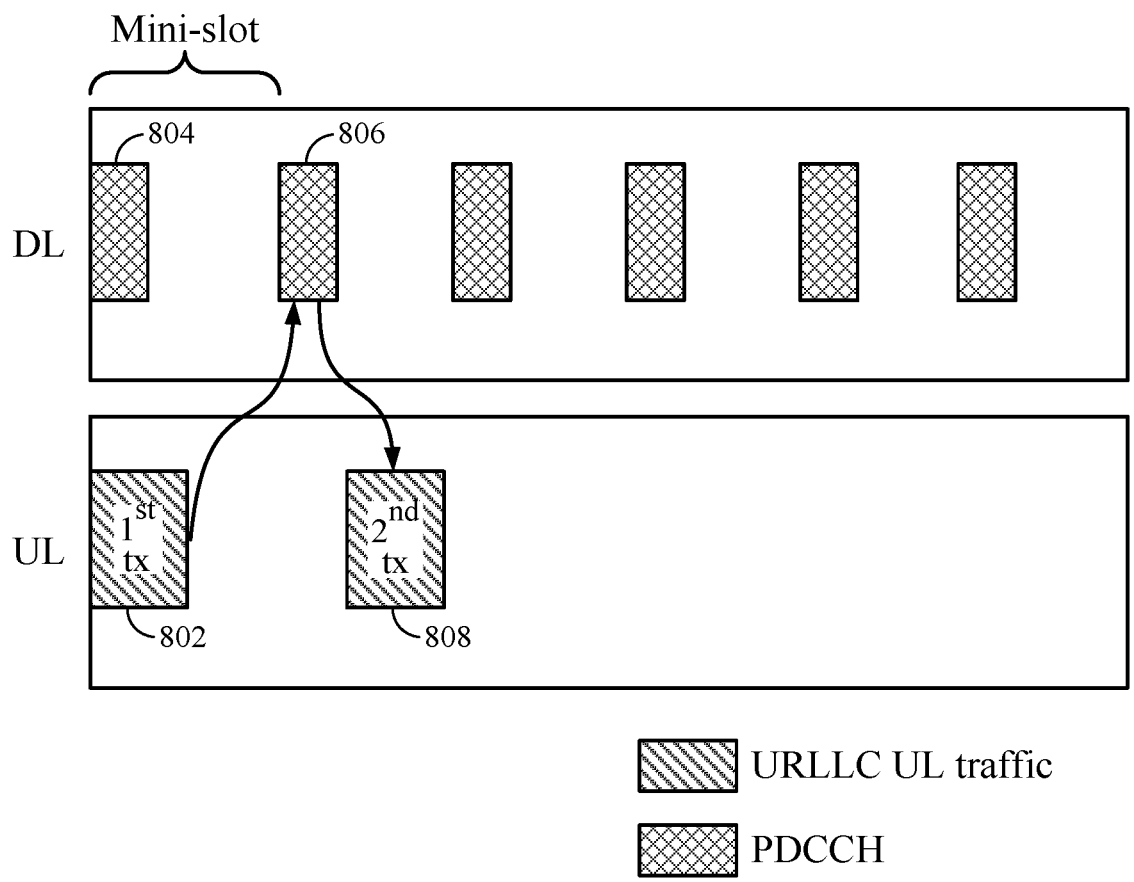
FIG. 8 illustrates an example uplink grant-free transmission scenario, in accordance with certain aspects of the present disclosure.

FIG. 8 illustrates an example of UL grant-free transmission (e.g., for URLLC) in NR, according to certain aspects of the present disclosure. URLLC in NR may support one or more types of UL grant-free transmission schemes/modes. In one UL grant free transmission scheme, a grant-free uplink transmission may occur on only the first uplink transmission 802. The subsequent (e.g., second, third, etc.) (re)-transmissions, if any, may be based on an uplink grant received from the gNB.

Using FIG. 8 as a reference example, only the first UL transmission 802 may be transmitted in a grant-free manner. That is, as opposed to sending the first transmission 802 using resources allocated by the gNB in an uplink grant, the URLLC UE may randomly select resources and send the first transmission 802 on the randomly selected resources. In some cases, however, the randomly selected resources for URLLC traffic may conflict with other scheduled resources 804 (e.g., resources used for scheduled on-going eMBB traffic), and may cause the URLLC transmissions to fail. Thus, in this transmission scheme, if the first transmission fails 802 in being decoded (but is successfully detected), the DL PDCCH in the next mini-slot 806 can schedule resource(s) for the second transmission 808. Meanwhile, on-going eMBB traffic on this scheduled resource may be suspended.

In another grant free transmission scheme, a grant-free uplink transmission may occur on multiple UL transmissions (e.g., all UL transmissions or up to K repetitions in some cases). Using FIG. 8 as a reference example, the first transmission 802 and second transmission 808 may be grant-free transmissions. The grant free (re)-transmissions may continue until an ACK is received or a max number K is achieved.

Example Inter-Cell Interference Mitigation for UL URLLC

Figure 9:
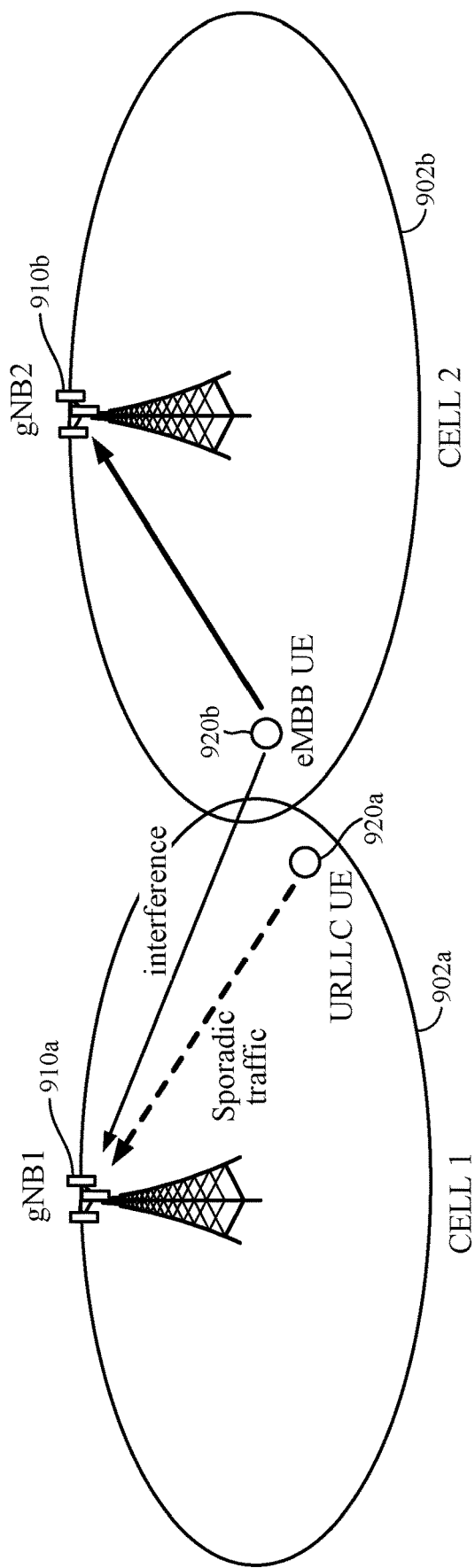
FIG. 9 illustrates an example inter-cell interference scenario, in accordance with certain aspects of the present disclosure.

As noted above, in some cases, the sporadic UL traffic for a cell-edge URLLC UE may be vulnerable due to the inter-cell interference from eMBB UL traffic in neighboring cells. FIG. 9 illustrates one reference example of an inter-cell interference scenario between a first cell 902a that supports URLLC and a second cell 902b that supports eMBB, according to certain aspects of the present disclosure.

As shown, a URLLC UE 920a may send URLLC traffic (e.g., in a grant-free manner) to gNB1 910a in the first cell 902a, and a eMBB UE 920b in the neighboring second cell 902b may send eMBB traffic to gNB2 910a. However, because eMBB traffic generally has a longer transmit duration than URLLC traffic, there may be situations where the uplink eMBB traffic in the second cell 902b may interfere with the uplink URLLC traffic (e.g., at the cell-edge) in the first cell 902a. Thus, if the URLLC UL fails in the first transmission (e.g., if gNB1 910a is unable to successfully decode the URLLC UL transmission), a retransmission(s) (regardless of whether the retransmission is grant-based or grant-free) may have a high likelihood of failing again due to the consistent inter-cell interference from the neighboring eMBB UE.

Aspects provide techniques and apparatus for mitigating inter-cell interference for UL URLLC. In particular, aspects provide a mini-slot based inter-cell interference mitigation scheme to protect the re-transmission(s) of the cell-edge URLLC UL traffic. As described in more detail below, the URLLC cell gNB may send out an over-the-air (OTA) indicator if the URLLC cell gNB detects a (decoding) failure of the URLLC UL transmission. eMBB UEs in the neighboring cells that receive the OTA indicator may perform a power fallback procedure in the subsequent transmissions in the current time window (e.g., slot).

Figure 10:
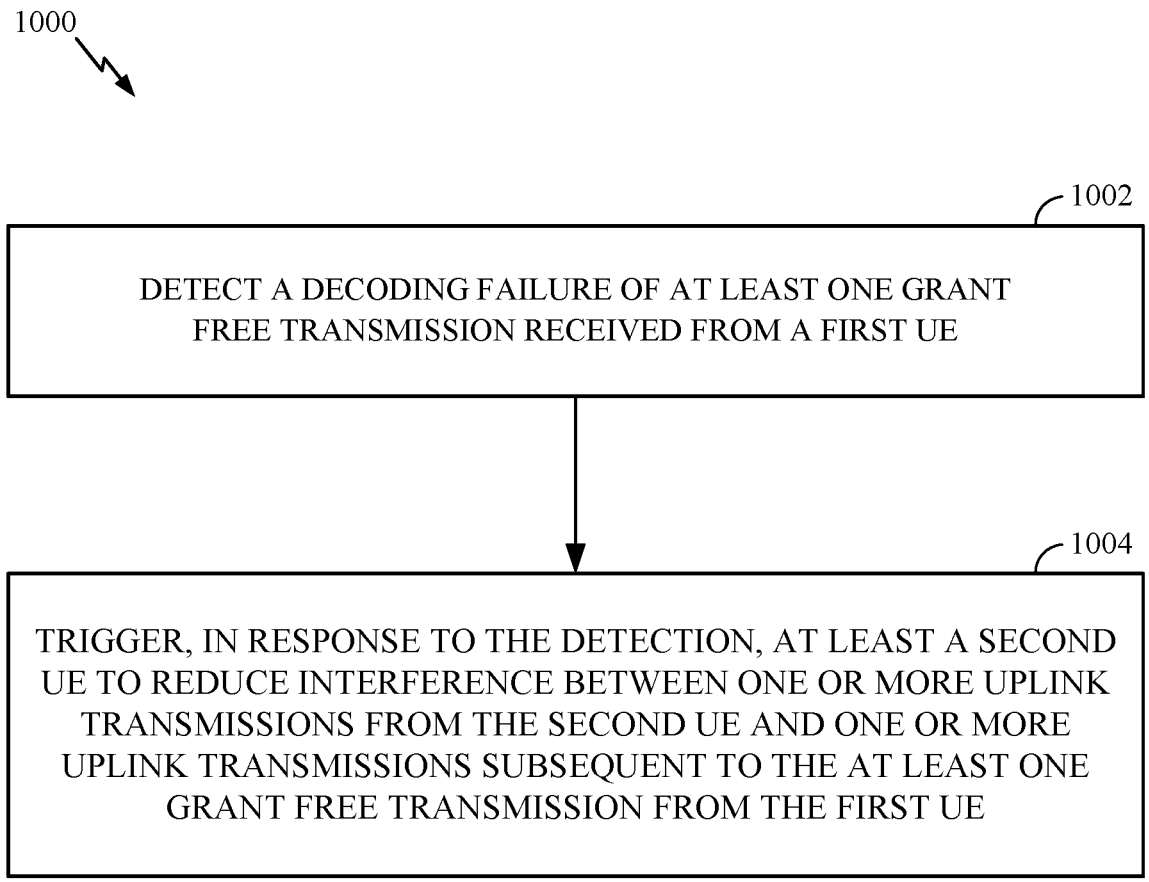
FIG. 10 illustrates example operations for wireless communications performed by a base station, in accordance with certain aspects of the present disclosure.

FIG. 10 illustrates example operations 1000 for wireless communications, in accordance with aspects of the present disclosure. Operations 1000 may be performed, for example, by a base station (e.g., a gNB), such as BS 110 shown in FIG. 1.

Operations 1000 begin, at 1002, where the base station (e.g., gNB1 in cell 902a) detects a decoding failure of at least one grant free transmission received from a first UE (e.g., URLLC UE). At 1004, the base station triggers, in response to the detection, at least a second UE (e.g., eMBB UE) to reduce interference between one or more uplink transmissions from the second UE and one or more uplink transmissions subsequent to the at least one grant free transmission from the first UE. In certain aspects, the trigger to reduce the interference may include a trigger to the second UE to reduce the transmission power of the one or more uplink transmissions from the second UE.

Figure 11:
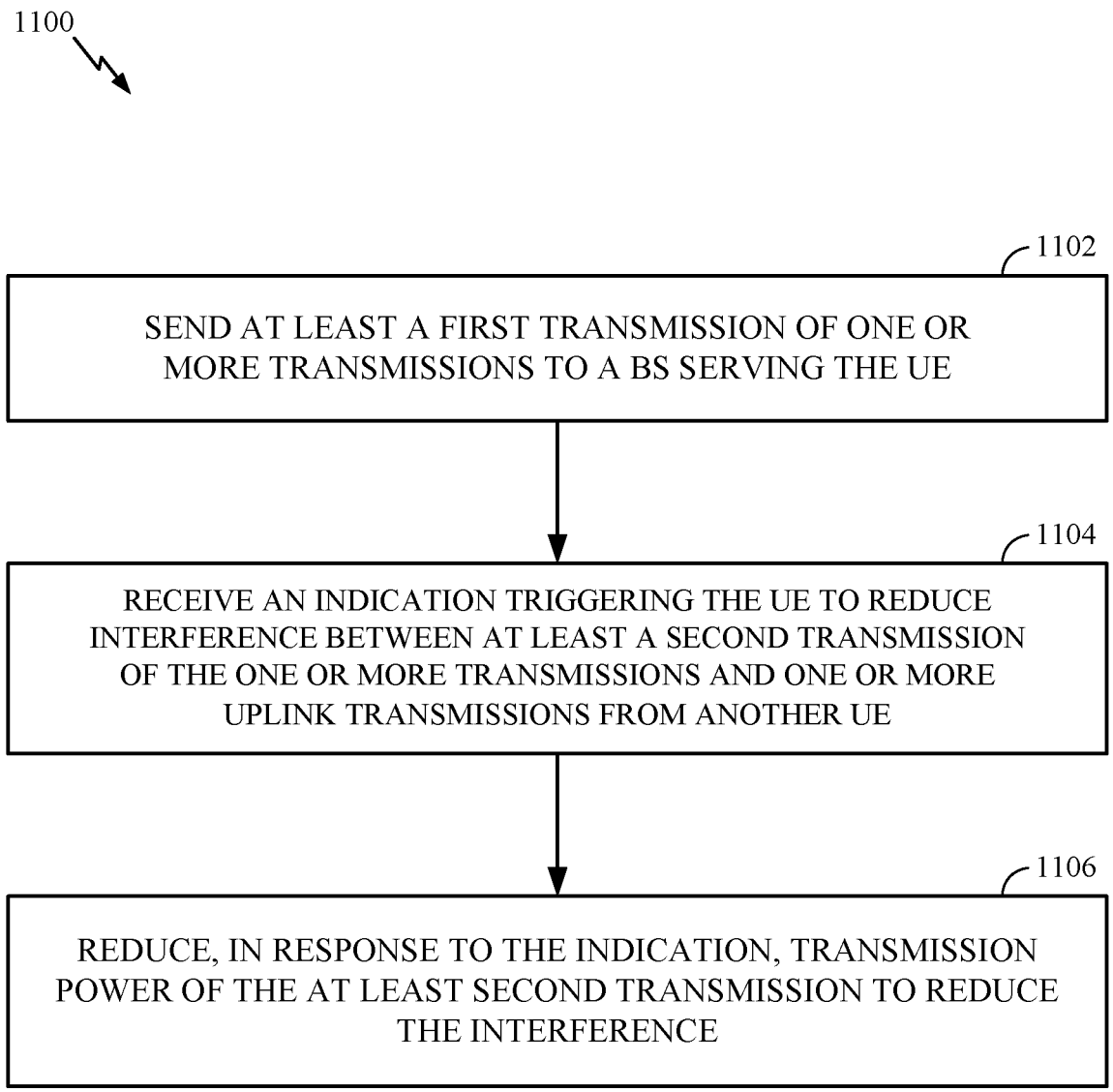
FIG. 11 illustrates example operations for wireless communications performed by a user equipment, in accordance with certain aspects of the present disclosure.

FIG. 11 illustrates example operations 1100 for wireless communications, in accordance with aspects of the present disclosure. Operations 1100 may be performed, for example, by a user equipment (e.g., eMBB UE), such as UE 120 shown in FIG. 1.

Operations 1100 begin, at 1102, where the UE sends at least a first transmission of one or more transmissions to a BS (e.g., gNB2 in cell 902b) serving the UE. At 1104, the UE receives an indication triggering the UE to reduce interference between at least a second transmission of the one or more transmissions and one or more uplink transmissions from another UE (e.g., URLLC UE in cell 1). At 1106, the UE reduces, in response to the indication, transmission power of the at least second transmission to reduce the interference.

According to certain aspects, the gNB that detected the decode failure may trigger the eMBB UE(s) to reduce the interference by sending an OTA power fallback indicator to the eMBB UE(s).

While triggering the eMBB UE(s) to reduce the interference, the gNB may not know the identity of the eMBB UE(s) causing the interference, but rather the gNB is aware that eMBB UE(s) in a neighboring cell may be causing interference with URLLC grant free transmission(s). For example, the eMBB UE(s) may not be connected to the gNB (e.g., not in an RRC connected mode with the gNB). In certain aspects, the eMBB UE(s) may be configured to monitor for and detect a message (e.g., a broadcast or multicast message addressed to the URLLC UE(s)) of the OTA power fallback indicator from the gNB. For instance, under a multicast application, the eMBB UE(s) may be configured to detect and decode certain messages addressed to the URLLC UE(s) such as a grant or ACK/NACK message, which is addressed to the URLLC UE(s) and decodable by the eMBB UE(s), as further described herein. Under a broadcast or multicast application, the eMBB UE(s) may be configured to monitor resources dedicated for triggering the eMBB UE(s) to reduce the interference. In certain aspects, the monitoring configuration may be established by a serving cell (e.g., gNB2 in cell 902b) of the eMBB UE(s) as further described herein.

In one aspect, the power fallback indicator may be an explicit OTA indicator sent via a dedicated channel. For example, the neighboring cells (e.g., cell 902a and cell 902b in FIG. 9) may agree on and reserve dedicated resource(s) for the use of indicating power fallback to the eMBB UEs. The agreement between the neighboring cells on the dedicated resource(s) may be done via a backhaul (e.g., X2 interface). The dedicated resource(s) can be a separate channel or a portion of a control channel (e.g., PDCCH) known to the eMBB UEs as configured by serving cell of the eMBB UEs and in use by the gNB serving the URLLC UEs.

Figure 12:
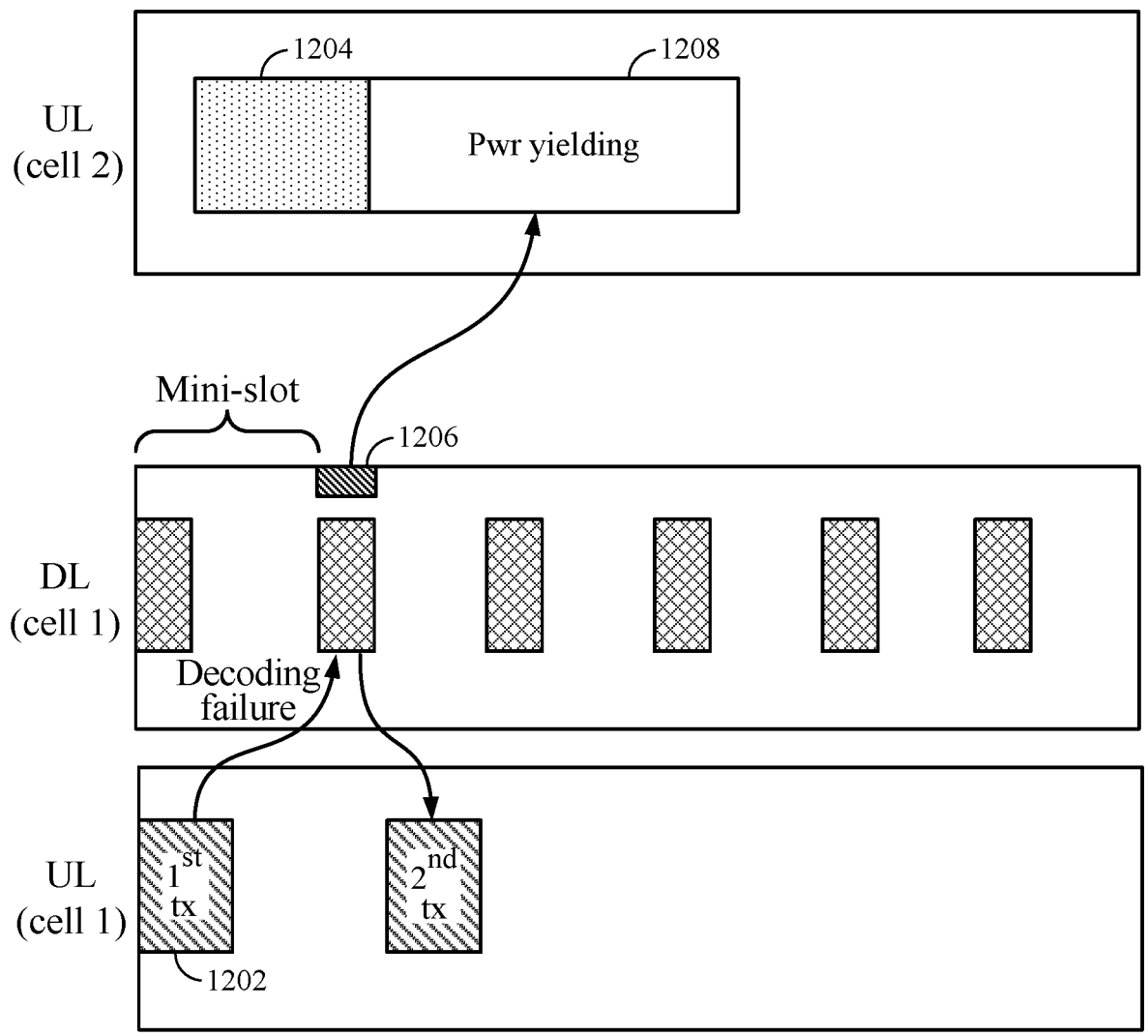
FIG. 12 illustrates an example of using an explicit indicator to trigger UE(s) to reduce inter-cell interference, in accordance with certain aspects of the present disclosure.
Figure 12:
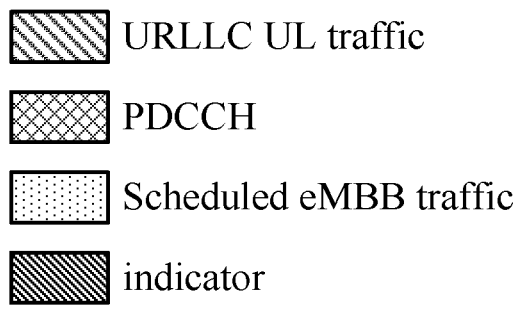

FIG. 12 illustrates an example of using an explicit indicator to trigger UE(s) to reduce inter-cell interference, in accordance with certain aspects of the present disclosure.

As shown, the cell 1 (e.g., URLLC-cell) gNB detects a decoding failure of the first URLLC uplink transmission 1202. The decoding failure may have been caused, in part, by the scheduled eMBB traffic 1204 in the uplink of cell 2 (e.g., eMBB cell). The first URLLC uplink transmission 1202 may be a grant-free uplink transmission (e.g., transmitted with resources that were not allocated by the URLLC-cell gNB in an uplink grant) or a grant-based uplink transmission. As shown, in response to the detection, the URLLC-cell gNB may broadcast an indicator 1206 on the reserved dedicated resource(s) in the next mini-slot. The explicit indicator 1206 may include an indication of a decoding failure at the URLLC-cell gNB of the first uplink transmission (e.g., grant free transmission). In some aspects, the indicator can be a single bit indicator. In some aspects, the indicator may include an indication of resource(s) allocated for the subsequent uplink transmissions (e.g., second transmission, third transmission, and so on) from the URLLC-cell UE. For example, in this aspect, the indicator may include multiple bits that indicate an UL time/frequency region with finer granularity. In some aspects, to gain a higher link budget, the indicator can be encoded into a longer sequence. This, however, may require additional resources.

The eMBB UE(s) in the neighboring cell may monitor the dedicated resource(s) for the explicit power-fallback indicator 1206. In some aspects, the eMBB UE(s) may monitor for the explicit indicator in every one or a few mini-slots. Each mini-slot may correspond to a duration of one or two OFDM symbols. In some aspects, the eMBB UE(s) may perform the monitoring in response to receiving an indication from the eMBB gNB that another UE in a neighboring cell (e.g., URLLC UE in cell 1) is in proximity (e.g., within a threshold range) to the UE.

As shown in FIG. 12, if the eMBB UE(s) receive the explicit indicator 1206 via the dedicated resources, the eMBB UE(s) can perform power fallback 1208 in the subsequent uplink transmissions in the current time window (e.g., slot) in cell 2. In some aspects, the eMBB UE(s) may reduce the transmission power on the resources in cell 2 that overlap with the resources used for the uplink transmissions in cell 1. For example, in cases where the explicit indicator includes an indication of the resource(s) used for the uplink URLLC transmissions, the eMBB UE(s) can identify the resources allocated for uplink transmissions to the eMBB gNB that overlap with the uplink URLLC resource(s) and reduce transmission power on the overlapping resources.

The eMBB UE may also send an indication to the eMBB gNB that the eMBB UE is engaged in performing power fallback (e.g., reducing transmission power or refraining from transmitting) in response to receiving the explicit indicator 1206. The indication may include information related to the power fallback such as an identifier the gNB that sent the indicator to trigger the power fallback, the degree of power fallback, and/or the duration of power fallback. The indication may enable the eMBB gNB to take measures to mitigate inter-cell interference from the eMBB UE.

In some cases, the overhead of introducing a dedicated channel to send an explicit power-fallback indicator can be significantly large, e.g., if using a multiple indicator and/or sending the indicator every mini-slot (e.g., one or two OFDM symbols). Accordingly, rather than introducing a new channel, aspects presented herein provide techniques for re-using an UL grant or ACK/NACK as an implicit indicator to trigger power fallback.

According to certain aspects, the URLLC gNB may send information regarding one or more URLLC UEs (e.g., URLLC UEs at the cell edge of the URLLC cell) to one or more neighboring cells that may have a high likelihood of causing inter-cell interference to the URLLC UE(s). The information may include, for example, at least one of the radio network temporary identifiers (RNTI(s)) (or other form of temporary ID) of the URLLC UE(s), the searching space of the grant sent to the URLLC UE(s), or the searching space for ACK/NACK sent to the URLLC UE(s). The information can be exchanged between the neighboring cells via a backhaul (e.g., X2 interface).

After detecting a decoding failure of a (e.g., first) grant-free transmission received from the URLLC UE, the URLLC gNB may implicitly trigger the eMBB UE(s) to reduce the interference by sending a grant to the URLLC UE for subsequent (e.g., second, third, etc.) uplink transmissions to the gNB. In another aspect, the gNB may implicitly trigger the eMBB UE(s) to reduce the interference by sending a NACK to the URLLC UE in response to detecting a decoding failure of a grant-free transmission. The eMBB UE(s) may monitor for the grant and/or NACK using the information of URLLC UE and, if the grant and/or NACK is detected, may reduce transmission power of subsequent uplink transmissions to the eMBB gNB in order to reduce the inter-cell interference.

Figure 13:
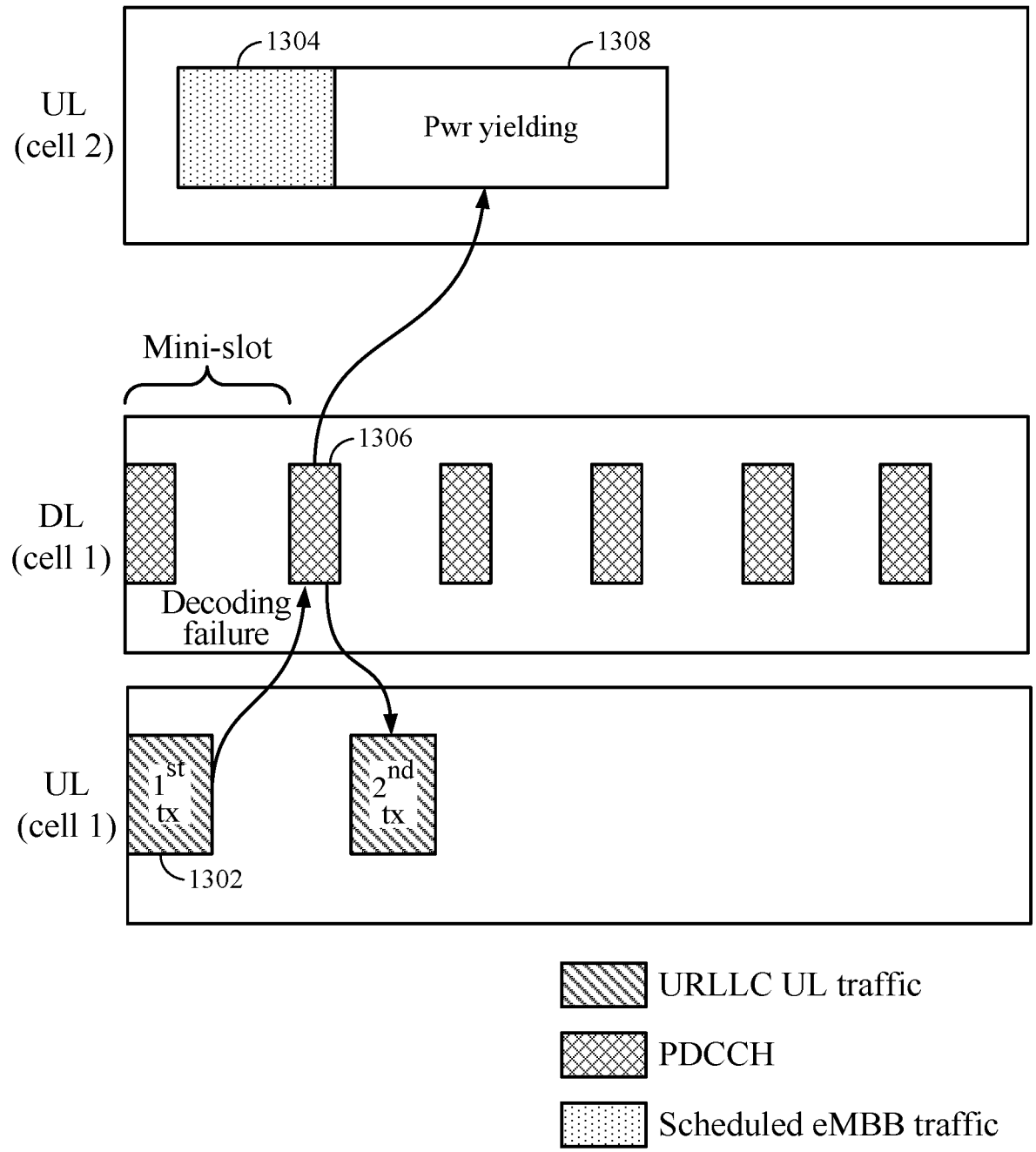
FIG. 13 illustrates an example of using an implicit indicator to trigger UE(s) to reduce inter-cell interference, in accordance with certain aspects of the present disclosure.

FIG. 13 illustrates an example of using an implicit indicator (e.g., UL grant and/or NACK) to trigger UE(s) to reduce inter-cell interference, in accordance with certain aspects of the present disclosure.

As shown, the cell 1 (e.g., URLLC-cell) gNB detects a decoding failure of the first URLLC uplink transmission 1302 (e.g., grant-free transmission). The decoding failure may have been caused, in part, by the scheduled eMBB traffic 1304 in the uplink of cell 2 (e.g., eMBB cell). Based on detecting the decoding failure, the URLLC-gNB may send an implicit indicator 1306 (e.g., a grant and/or a NACK) to the URLLC UE for subsequent transmissions. In certain aspects, the eMBB UE in the neighboring cell (e.g., cell 2) may detect the grant, and in response, perform a power fallback 1308 in the subsequent transmissions in the current slot in cell 2. The eMBB UE, for example, may monitor for the grant in the resources associated with the search space for the grant, and, if detected, decode the grant with the identifier of the URLLC UE. The eMBB UE may perform the monitoring every one or a few mini-slots (e.g., one or two OFDM symbols). The eMBB UE may begin monitoring for the grant in response to receiving an indication that the URLLC UE is in proximity to the eMBB UE. The grant may implicitly indicate a decoding failure of the (e.g., first) grant free transmission from the URLLC UE at the URLLC gNB.

In some cases, the grant may include an indication of resources allocated to the URLLC UE for subsequent (e.g., second, third, etc.) uplink transmissions. In some aspects, a eMBB UE may determine whether to perform power fallback based on whether its allocated resources for uplink transmissions to the eMBB gNB overlap with the granted URLLC resources. For example, there may be a subset of eMBB UE(s) in cell 2 (with resources overlapping with the granted URLLC resources) that determine to perform power fallback.

Further, the eMBB UEs may monitor for an ACK or NACK, which may serve as the implicit indicator 1306, in resources associated with the search space used to send ACK/NACK to the URLLC UE. Similar to above, this monitoring may occur every one to a few mini-slot and may begin in response to receiving an indication that the URLLC UE is in proximity to the eMBB UE. If a NACK is detected, the eMBB UE may decode the NACK with the identifier of the URLLC UE. The eMBB UE may implicitly determine from the NACK that the URLLC gNB detected a decoding failure of a grant free transmission from the URLLC UE, and reduce transmission power of subsequent uplink transmissions in the current slot of cell 2 to reduce the inter-cell interference.

In some aspects, the eMBB UE(s) may perform a power fallback by selecting a pre-assigned power level. For example, the eMBB UE(s) may be configured via RRC signaling with N quantized power levels, and may perform a power fallback (or reduce transmission power) by going from a higher level of the N pre-assigned power levels to a lower level of the N pre-assigned power levels. In some aspects, if the link budget of the explicit or implicit indicators is an issue, the gNB can use a higher power to transmit at least one of the dedicated channel, grant, or ACK/NACK.

Further, in some cases, the overhead of monitoring and decoding the explicit indication or implicit (e.g., UL grant, ACK/NACK) indication can be large (e.g., above a threshold), e.g., if the search space of the grant or ACK/NACK is large. In such cases, the overhead can be reduced by monitoring for the indication in the mini-slots at a reduced periodicity (e.g., as opposed to monitoring for the indication at every mini-slot). The particular periodicity at which the monitoring is performed may lead to a tradeoff between the performance of the inter-cell interference mitigation and the overhead of the monitoring and decoding. Further, note that while aspects presented herein provide techniques for using OTA indicators to perform inter-cell interference mitigation, the techniques presented herein can also be used in addition to (or alternatively to) backhaul solutions for reducing inter-cell interference.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for monitoring, means for indicating, means for detecting, means for triggering and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for detecting, means for decoding, means for triggering, means for reducing, means for allocating, means for monitoring, means for performing, means for identifying, means for configuring, means for supporting, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include the instructions for performing the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
   detecting a decoding failure of at least one grant free transmission received from a first user equipment (UE);
   sending, to another BS serving a second UE, an indication of information associated with a trigger to reduce interference between the first UE and the second UE, wherein the indication of the information includes a first search space used for sending an acknowledgment (ACK) or a negative acknowledgment (NACK) to the first UE; and
   in response to the detection and after sending the indication to the other BS, triggering at least the second UE, which is served by the other BS, to reduce interference between one or more uplink transmissions from the second UE and one or more uplink transmissions subsequent to the at least one grant free transmission from the first UE.

2. The method of claim 1, wherein triggering the at least second UE to reduce interference comprises triggering the second UE to reduce transmission power of the one or more uplink transmissions from the second UE.

3. The method of claim 1, wherein triggering the at least second UE to reduce the interference comprises sending an indication of the decoding failure to the at least second UE.

4. The method of claim 3, wherein the indication of the decoding failure is sent via one or more resources dedicated for triggering the at least second UE to reduce the interference.

5. The method of claim 3, wherein the indication of the decoding failure comprises an indication of one or more resources allocated for the one or more subsequent uplink transmissions from the first UE.

6. The method of claim 1, wherein:
   triggering the at least second UE to reduce the interference comprises sending a grant to the at least first UE for at least one of the one or more subsequent uplink transmissions from the first UE.

7. The method of claim 6, wherein the grant comprises an indication of one or more resources allocated for the one or more subsequent uplink transmissions from the first UE.

8. The method of claim 1, wherein triggering the at least second UE to reduce the interference comprises sending a negative acknowledgment (NACK) to the first UE in response to detecting the decoding failure of the at least one grant free transmission.

9. The method of claim 1, wherein the information associated with the trigger further includes at least one of an identifier of the first UE or a second search space used for sending a grant to the first UE.

10. The method of claim 1, wherein:
    the first UE supports ultra-reliable low latency communications (URLLC); and
    the second UE supports enhanced mobile broadband (eMBB).

11. The method of claim 1, wherein triggering the at least second UE comprises sending a multicast message addressed to the first UE and decodable by the at least second UE.

12. A method for wireless communication by a user equipment (UE), comprising:
    sending at least a first transmission of one or more transmissions to a base station (BS) serving the UE;
    receiving, from the BS serving the UE, a first indication of information associated with a trigger to reduce interference between the UE and another UE, wherein the indication of the information includes a first search space used for sending an acknowledgment (ACK) and or a negative acknowledgment (NACK) to the other UE;
    receiving, from another BS, a second indication triggering the UE to reduce interference between at least a second transmission of the one or more transmissions and one or more uplink transmissions from the other UE via the first search space, wherein the second indication includes a NACK implicitly indicating to the UE to reduce the transmission power of the second transmission; and in response to the second indication and after receiving the first indication from the other BS, reducing transmission power of the second transmission to reduce the interference.

13. The method of claim 12, further comprising:
monitoring one or more resources dedicated for receiving the second indication, wherein the second indication is received on the one or more dedicated resources in use by the other BS.

14. The method of claim 13, wherein the monitoring is performed in response to receiving an indication from the BS that the other UE is in proximity to the UE.

15. The method of claim 12, wherein the second indication triggering the UE to reduce interference comprises an indication of a decoding failure of at least one grant free transmission from the other UE at the other BS serving the other UE.

16. The method of claim 12, wherein:
the second indication comprises an indication of one or more first resources allocated for the one or more uplink transmissions from the other UE.

17. The method of claim 16, wherein reducing the transmission power comprises:
identifying one or more second resources allocated for the one or more transmissions to the BS that overlap with the one or more first resources; and
reducing transmission power on the one or more second resources.

18. The method of claim 12, wherein
the information associated with the trigger includes at least one of an identifier of the other UE or a second search space used for sending a grant to the other UE for the one or more uplink transmissions from the other UE; and
further comprising monitoring for the grant in one or more resources associated with the second search space.

19. The method of claim 18, wherein receiving the second indication comprises:
detecting the grant in the one or more resources associated with the second search space; and
decoding the grant with the identifier of the other UE.

20. The method of claim 19, wherein the grant implicitly indicates a decoding failure of at least one grant free transmission from the other UE at the other base station serving the other UE.

21. The method of claim 19, wherein:
the grant comprises a third indication of one or more first resources allocated for the one or more uplink transmissions from the other UE.

22. The method of claim 21, wherein reducing the transmission power comprises:
identifying one or more second resources allocated for the one or more transmissions to the BS that overlap with the one or more first resources; and
reducing transmission power on the one or more second resources.

23. The method of claim 12, wherein
the information associated with the trigger further includes an identifier of the other UE; and
further comprising monitoring for an ACK or NACK in one or more resources associated with the first search space.

24. The method of claim 23, wherein receiving the second indication triggering the UE to reduce the interference comprises:
detecting the NACK in the one or more resources associated with the first search space; and
decoding the NACK with the identifier of the other UE.

25. The method of claim 24, wherein the NACK implicitly indicates a decoding failure of at least one grant free transmission from the other UE at the other base station serving the other UE.

26. The method of claim 12, wherein:
the UE supports enhanced mobile broadband (eMBB); and
the other UE supports ultra-reliable low latency communications (URLLC).

27. The method of claim 12, wherein receiving the second indication comprises receiving a multicast message addressed to the other UE, which is served by the other BS.

28. The method of claim 12, further comprising sending, to the BS serving the UE, a third indication that the UE is reducing transmission power.

29. An apparatus for wireless communications, comprising:
a processing system configured to detect a decoding failure of at least one grant free transmission received from a first user equipment (UE); and
a transmitter configured to:
send, to a separate network entity from the apparatus serving a second UE, an indication of information associated with a trigger to reduce interference between the first UE and the second UE, wherein the indication of the information includes a first search space used for sending an acknowledgment (ACK) or a negative acknowledgment (NACK) to the first UE; and
in response to the detection and after sending the indication to the separate network entity, trigger at least the second UE, which is served by the separate network entity from the apparatus, to reduce interference between one or more uplink transmissions from the second UE and one or more uplink transmissions subsequent to the at least one grant free transmission from the first UE.

30. An apparatus for wireless communications, comprising:
a transmitter configured to transmit at least a first transmission of one or more transmissions to a base station (BS) serving the apparatus;
a receiver configured to:
receive, from the BS serving the apparatus, a first indication of information associated with a trigger to reduce interference between the apparatus and another separate apparatus for wireless communications, wherein the indication of the information includes a first search space used for sending an acknowledgment (ACK) and or a negative acknowledgment (NACK) to the other UE;
receive, from another B S, a second indication triggering the apparatus to reduce interference between at least a second transmission of the one or more transmissions and one or more uplink transmissions from the other separate apparatus via the first search space, wherein the second indication includes a NACK implicitly indicating to the UE to reduce the transmission power of the second transmission; and a processing system configured to, in response to the second indication and after receiving the first indication from the other BS, reduce transmission power of the at least second transmission to reduce the interference.

\* \* \* \* \*